No. 877,218. PATENTED JAN. 21, 1908.
W. E. MORGAN.
RULE GAGE.
APPLICATION FILED APR. 27, 1907.

WITNESSES:
John Schreiber
C R. Olney.

INVENTOR.
W. E. Morgan.
BY
Carlos P. Griffin
ATTORNEY.

UNITED STATES PATENT OFFICE.

WESLEY E. MORGAN, OF SAN FRANCISCO, CALIFORNIA.

RULE-GAGE.

No. 877,218.  Specification of Letters Patent.  Patented Jan. 21, 1908.

Application filed April 27, 1907. Serial No. 370,720.

*To all whom it may concern:*

Be it known that I, WESLEY E. MORGAN, a citizen of the United States, residing in the city and county of San Francisco, State of California, have invented certain new and and useful Improvements in Rule-Gages, of which the following is a specification in such full and clear terms as will enable those skilled in the art to which it appertains to construct and use the same.

The objects of this invention are to make a rule gage that will be applicable to any of the common carpenter's rules now on sale in the hardware stores, to make a rule gage that may be applied to the rule at any time without being fastened to the rule in any way that requires screws or the like to hold it in place, and to make a gage that may be carried with the rule, if the user so desires.

Another object of the invention is to provide means to secure the gage in a given position on the rule without injuring the rule in any way, and at the same time providing such a fastening as will be easily changed to any other position at any time.

Another object of the invention is to make a gage that will fold down as close as it is possible to make it, in order that a person may carry the rule and gage together whenever they may desire so to do.

Another object of the invention is to make a gage that may be locked securely in the position in which the gage is to be used, and at the same time to provide a latch which will be at once cheaply made as well as efficient.

Other objects of the invention will appear as the description proceeds.

Figure 1:
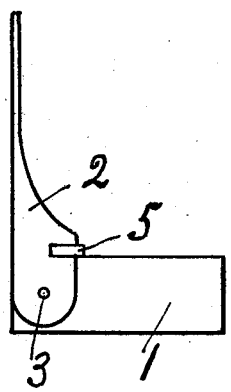
Figure 2:
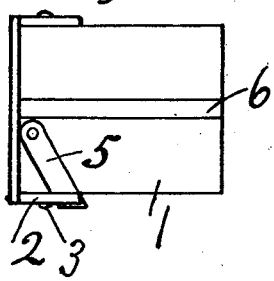
Figure 3:
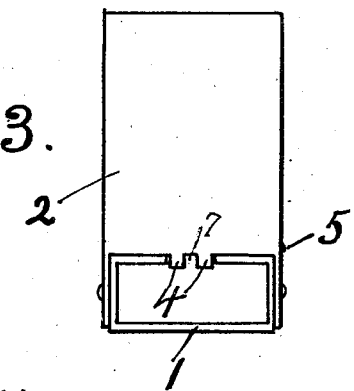
Figure 4:
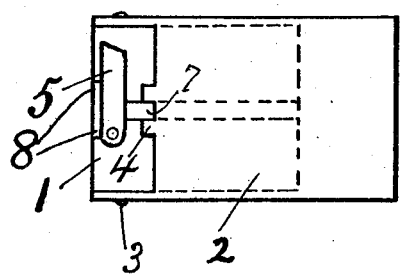

In the drawings, in which like numerals refer to like parts throughout, Figure 1 is a side elevation of the gage. Fig. 2 is a plan of the gage. Fig. 3 is an end elevation of the gage, and Fig. 4 is a plan of the gage with the gage member folded down.

The gage is composed of the body 1 which is of the proper size to go over one of the arms of the common carpenter's rules. It is bent up so as to leave a space 6 which will pass over the pins in the rule without injuring the same, said pins being necessary to prevent injury to the rule joints as is well known; and at the pivot end of the gage body 1 a pair of notches 8 are cut to allow the lugs 4 to pass, in order that the lugs may touch the wood of the rule to hold the gage in the proper place thereon.

The gage proper 2 is pivoted to one end of the gage body 1 by means of the pivots 3 which pass through the ears of the gage 2. One of these ears is provided with a notch in which the latch 5 is placed when the gage is up, to secure it in that position. This latch is small enough to turn around out of the way, as shown in Fig. 4, when the gage member may be folded down out of the way.

Unless means to secure the gage in a given position on the rule is provided the gage will slip when in use, and to prevent this the lugs 4 are provided. These lugs extend below the top of the body of the gage a short distance, as shown in Fig. 3, and in this way they press into the wood of the rule enough to hold the gage firmly in any desired position. The notch 7 is provided to allow the gage body to be moved along over the pins in the rule, the notch being placed adjacent the open space 6 of the gage body 1, and on the gage member 2 between the lugs 4.

It will be observed that when the gage member is to be lowered that the lugs 4 rise at first, so that they just pass over the latch 5; and the gage is long enough to extend beyond the gage body to form a means to assist the user in raising the gage to the upright position.

The gage may be placed on any stick that may be of the size of the rule body, but it is especially adapted to be used with a carpenter's rule, since it folds down and takes up no extra space when not in use. It will be observed that the latch is short enough to be entirely out of the way when the gage is in use, as shown in Fig. 4, since when it turns around to allow the gage member to lie down it lies in the space formed by the gage member hinges and the end of the gage body.

Having thus described my invention in such full and clear terms as will enable those skilled in the art to which it appertains to construct and use the same, what I claim as new and desire to secure by Letters Patent of the United States is as follows:

1. In a rule gage, the combination of a gage body, a gage having ears depending below the top of the gage body and pivoted to the body on opposite edges thereof near one end, a latch pivoted to the top of the gage body and adapted to take in a notch in the gage member, and depending lugs adapted to project below the top of the gage body to secure the gage in a given position on the rule, substantially as described.

2. In a rule gage, the combination of a gage body, a gage pivoted thereto near one end thereof, a latch pivoted to the top of the body and adapted to move in a plane parallel to the top of the body and take in a notch in the gage member, and extensions of the gage member adapted to project below the top of the gage body to secure the gage in a given position on the rule, substantially as described.

3. In a rule gage, the combination of a gage body, a gage adapted to fold down on the body and pivoted thereto near one end of the same and on opposite edges thereof, a latch pivoted to the body near the center of the top thereof at one end and of less length than the width of the body said latch adapted to take in a notch in the gage member, and means to secure the gage in a given position on the rule, substantially as described.

4. In a rule gage, the combination of a rectangular gage body having a slot from end to end thereof, a gage pivoted to the body near one end thereof and on opposite edges of the same, a latch pivoted to the body near the end at which the gage is pivoted and adapted to turn in a plane parallel to the top of the body and take in a notch in the gage member, and means carried by the gage member to secure the gage body in a given position on the rule, substantially as described.

5. In a rule gage, the combination of a gage body, a gage member pivoted to the body and near one end thereof, a latch pivoted to the body and shorter than the width of the body, and adapted to secure the gage member upright, and a lug carried by the gage member and adapted to secure the gage in a given position on the rule.

6. In a rule gage, the combination of a gage body, a gage member pivoted thereto near one end, a latch pivoted to the body near one end and of less length than the width of the body and adapted to take in a notch in the gage member, and means to secure the gage in a given position on the lug.

7. In a rule gage, the combination of a gage body, a gage member pivoted thereto near one end thereof and having a notch in one of its edges, a latch pivoted to the gage body near the center of the same and being of less length than the width of the gage and adapted to take in the notch in the gage member, and a lug on the gage member adapted to project across the metal of the gage body to hold the gage in a given position on the rule.

In testimony whereof I have hereunto set my hand in the presence of the two subscribing witnesses this 20th day of April A. D. 1907, in the city of San Francisco, Cal.

WESLEY E. MORGAN.

Witnesses:
CARLOS P. GRIFFIN,
J. H. WARE.